(12) United States Patent
Bao et al.

(10) Patent No.: US 10,326,170 B2
(45) Date of Patent: Jun. 18, 2019

(54) ELECTROCHEMICAL ENERGY STORAGE DEVICE

(71) Applicant: NINGDE AMPEREX TECHNOLOGY LIMITED, Ningde, Fujian Province (CN)

(72) Inventors: Jinzhen Bao, Ningde (CN); Honggang Yu, Ningde (CN); Zheng Cao, Ningde (CN); Chao Yang, Ningde (CN); Hongxin Fang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 39 days.

(21) Appl. No.: 15/578,932

(22) PCT Filed: Jun. 3, 2015

(86) PCT No.: PCT/CN2015/080627
§ 371 (c)(1),
(2) Date: Dec. 1, 2017

(87) PCT Pub. No.: WO2016/192051
PCT Pub. Date: Dec. 8, 2016

(65) Prior Publication Data
US 2018/0175455 A1    Jun. 21, 2018

(51) Int. Cl.
*H01M 2/02*    (2006.01)
*H01M 10/0587*    (2010.01)
*H01M 10/0525*    (2010.01)
*H01M 10/04*    (2006.01)
*H01M 10/052*    (2010.01)
*H01M 10/0583*    (2010.01)

(52) U.S. Cl.
CPC ..... *H01M 10/0587* (2013.01); *H01M 2/0287* (2013.01); *H01M 10/0431* (2013.01); *H01M 10/052* (2013.01); *H01M 10/0525* (2013.01); *H01M 10/0583* (2013.01)

(58) Field of Classification Search
None
See application file for complete search history.

(56) References Cited

FOREIGN PATENT DOCUMENTS

| CN | 202585658 | 12/2012 |
|---|---|---|
| CN | 203071179 | 7/2013 |

OTHER PUBLICATIONS

International Search report dated Mar. 7, 2016 from corresponding application No. PCT/CN2015/080627.

*Primary Examiner* — Sarah A. Slifka
(74) *Attorney, Agent, or Firm* — Hauptman Ham, LLP

(57) ABSTRACT

An electrochemical energy storage device comprising an electrode assembly, an electrolyte, a packing shell and an adhesive material located between the electrode assembly and the packing shell. The adhesive material comprises an adhesive layer and a protective layer. A surface of the adhesive layer, arranged on an outer surface of the electrode assembly and far away from the cell, or a surface of the adhesive layer, arranged on an inner surface of the packing shell and close to the electrode assembly, are adhesive surfaces. The protective layer is arranged on the adhesive surface of the adhesive layer. The protective layer is non-cohesive at a normal temperature and pressure, after the protective layer is fully or partially dissolved in the electrolyte, the adhesive surface of the adhesive layer is exposed to bond the electrode assembly with the packing shell, and the protective layer contains a substance to bear an electric charge.

38 Claims, 2 Drawing Sheets

ELECTROCHEMICAL ENERGY STORAGE DEVICE

RELATED APPLICATIONS

The present application is a National Phase of International Application Number PCT/CN2015/080627, filed Jun. 3, 2015.

TECHNICAL FIELD

The invention relates to the technical field of electrochemistry, in particular to an electrochemical energy storage device.

BACKGROUND TECHNOLOGY

Lithium-ion secondary batteries have the advantages of high voltage, small volume, light weight, high specific capacity, no memory effect, no pollution, small self-discharge and long cycle life, which make them has been an unprecedented development in communication, electrical appliances, electronic information, power equipment and Energy storage and other fields, and with the ever-changing society, people put forward higher requirements on the energy density, charge-discharge speed, cycle life and safety performance of the lithium-ion secondary batteries.

Drop test is a more stringent safety testing of lithium-ion secondary batteries. After the lithium-ion secondary battery drop test, it is extremely prone to fall off the top seal open, leakage, isolation membrane wrinkles, the short circuit, tab pull off and other issues. At present, by sticking the traditional double-sided adhesive tape between the electrode assembly and the Packing shell, various problems that occur when the lithium-ion secondary battery falls can be solved, but due to the adhesive layer on both sides of the adhesive tape, During the process of entering the package, the adhesive tape will bond with the Packing shell, increasing the difficulty of the process of entering the package (i.e. enter into the Packing shell). However, the protective layer is the conventional polymer covering the adhesive side of the double-sided tape, which will deteriorate the kinetic performance of the lithium ion secondary battery due to the electrochemical inertness of the protective layer dissolved in the electrolyte.

CONTENT OF THE INVENTION

In view of the problems in the background art, an object of the present invention is to provide an electrochemical energy storage device, the electrochemical energy storage device can achieve a fixed connection between a electrode assembly and a packing shell and solve various problems occurring in the drop test, can also avoid the problem that it is difficult for the electrode assembly to be placed into a shell due to the fact that two surfaces of an adhesive material are adhesive, and has good electrochemical properties.

In order to achieve the above object, the present invention provides an electrochemical energy storage device, which includes a electrode assembly, an electrolyte, and a packing shell. The electrode assembly comprises a positive plate, a negative plate and a separator film which is arranged between the positive plate and the negative plate; the electrolyte impregnates the electrode assembly; the packing shell encloses the electrode assembly and contains the electrolyte. The electrochemical energy storage device further includes an adhesive material, which located between the electrode assembly and the packing shell. Adhesive material includes adhesive layer and protective layer. The adhesive layer is directly or indirectly disposed on the outer surface of the electrode assembly and the side thereof away from the electrode assembly is an adhesive surface; or the adhesive layer is directly or indirectly disposed on the inner surface of the packing shell, and the surface thereof close to the electrode assembly is the adhesive surface. The protective layer is arranged on the adhesive surface of the adhesive layer, the protective layer is non-adhesive under normal temperature and pressure, the adhesive surface of the adhesive layer will not expose until the protective layer is completely or partially dissolved in the electrolyte, and then the electrode assembly and the package shell are bonded together by the adhesive surface. The protective layer contains a substance that can bear an electric charge.

Compared with the prior art, the beneficial effects of the present invention are as follows:

1. The protective layer of the adhesive material of the invention is non-adhesive at normal temperature and normal pressure and does not bond the electrode assembly and the packing shell together until the protective layer is completely or partially dissolved in the electrolyte and removed therefrom, which thus avoid the problem that it is difficult for the electrode assembly to be placed into a shell due to the fact that two surfaces of an adhesive material are adhesive.

2. The protective layer of the adhesive material of the invention comprises a charge-carriable substance with high electrochemical activity. After the protective layer is fully or partially dissolved in the electrolyte, the substance that can bear charges can be used as a good charge carrier to improve the circulation performance and low temperature performance of the electrochemical energy storage device.

The reference numbers are as follows:
1 electrode assembly;
  11 Winding ending;
2 packing shell;
3 adhesive material;
  31 adhesive layer;
  32 protective layer;
4 adhesive tape;

DETAILED DESCRIPTION

The electrochemical energy storage device according to the present invention and embodiment of the present invention, the comparative examples and the test procedures, and the test results will be described below.

Figure 1:
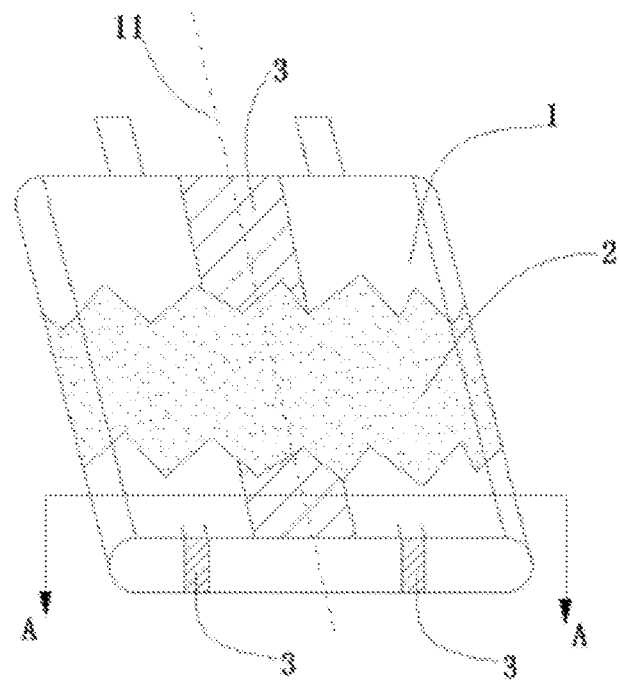
FIG. 1 is a partially cut-away perspective view of an electrochemical energy storage device according to an embodiment of the present invention.
Figure 2:
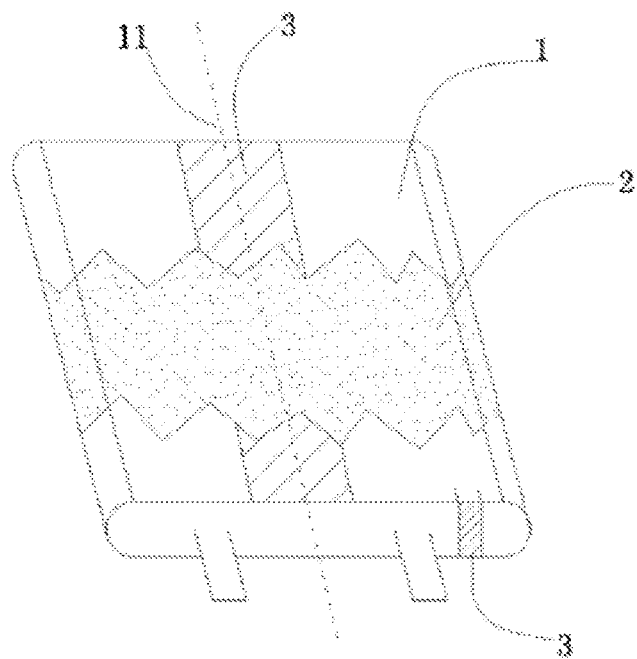
FIG. 2 is a partially cut-away perspective view of an electrochemical energy storage device according to another embodiment of the present invention.
Figure 3:
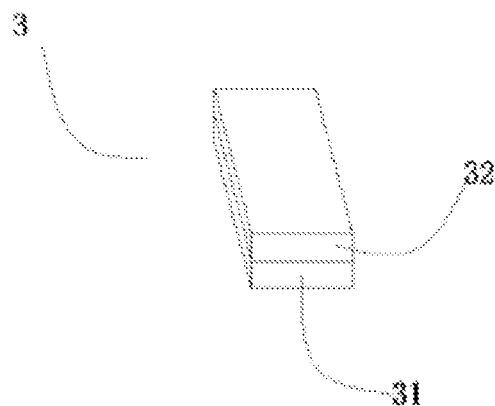
FIG. 3 is a schematic structural view of an embodiment of an adhesive material of an electrochemical energy storage device according to the present invention.

First, an electrochemical energy storage device according to the present invention will be described. Referring to FIG. 1-3, the electrochemical energy storage device includes a electrode assembly 1, an electrolyte, and a packing shell 2. The electrode assembly 1 comprises a positive plate, a negative plate, and a separator film which is arranged between the positive plate and the negative plate. The electrolyte impregnates the electrode assembly 1. The packing shell 2 encloses the electrode assembly 1 and contains the electrolyte. The electrochemical energy storage device further includes an adhesive material 3 located between the electrode assembly 1 and the packing shell 2. The adhesive material 3 included an adhesive layer 31 and a protective layer 32. The adhesive layer 31 is directly or indirectly disposed on the outer surface of the electrode assembly 1 and the side thereof away from the electrode assembly 1 is an adhesive surface; or the adhesive layer 31 is directly or indirectly disposed on the inner surface of the packing shell 2, and the surface thereof close to the electrode assembly 1 is an adhesive surface. The protective layer 32 is disposed on the adhesive surface of the adhesive layer 31. The protective layer 32 is not-adhesive under normal temperature and pressure. The protective layer 32 is completely or partially dissolved in the electrolyte to expose the adhesive surface of the adhesive layer 31, the electrode assembly 1 and the packing shell 2 are bonded together, and the protective layer 32 contains a substance that can bear an electric charge.

In the electrochemical energy storage device according to the present invention, the protective layer 32 of the adhesive material 3 is non-adhesive under normal temperature and pressure, the electrode assembly will not be adhered to the packing shell 2 until the protective layer 32 is completely or partially dissolved in the electrolyte and removed therefrom, which can avoid the problem that it is difficult for the electrode assembly to be placed into a shell due to the fact that two surfaces of an adhesive material are adhesive.

In the electrochemical energy storage device according to the present invention, the protective layer 32 of the adhesive material 3 contains a charge-carriable substance with high electrochemical activity, which can be used as a good charge carrier when the protective layer 32 is completely or partially dissolved in the electrolyte. The charge-carriable substance can improve the cycle performance and low temperature performance of the electrochemical energy storage device. In an embodiment, when the adhesive surface of the adhesive layer 31 is exposed after the protective layer 32 is completely or partially dissolved in the electrolyte, the packing shell 2 may be pressed and/or heated externally or the like so that the electrode assembly 1 and the packing shell 2 are bonded together.

In the electrochemical energy storage device according to the present invention, the electrochemical energy storage device may be selected from one of a lithium ion secondary battery, a super capacitor, a fuel cell, and a solar cell.

In the electrochemical energy storage device according to the invention, the electrode assembly 1 can be a coiled electrode assembly, a folded electrode assembly, or a stacking coiled electrode assembly.

In the electrochemical energy storage device according to the present invention, the electrolyte includes a lithium salt and a non-aqueous organic solvent. The lithium salt is at least one selected from $LiPF_6$, $LiBF_4$, LiBOB, $LiAsF_6$, $Li(CF_3SO_2)_2N$, $LiCF_3SO_3$ and $LiClO_4$; the non-aqueous organic solvent is selected from the group consisting of a cyclic carbonate or a chain carbonate or a mixture of both.

In the electrochemical energy storage device according to the invention, the adhesive material 3 can be arranged at any position between the electrode assembly 1 and the packing shell 2. For example, the adhesive material 3 may be disposed at the winding ending 11 of the wound-type electrode assembly 1 or anywhere on the surface of the electrode assembly 1 directly opposite to the packing shell 2. The adhesive material 3 may be disposed around the top and the bottom of the electrode assembly 1 at the same time in a direction perpendicular to the width direction of the electrode assembly 1. The adhesive material 3 may be arranged at any one of the edges and the corners of the electrode assembly 1 or at several positions at the same time. The adhesive material 3 may be disposed at the position of the packing shell 2 facing winding ending 11 of the electrode assembly 1. Preferably, the adhesive material 3 may be disposed at the same time around the top and bottom of the electrode assembly 1 perpendicular to the width direction of the electrode assembly 1 to prevent the separator film from being displaced or wrinkled. The area of the adhesive material 3 does not exceed the surface area of the electrode assembly 1. The shape of the adhesive material 3 may be one or more of rectangle, circle, rhombus, triangle, ring, homocentric squares, porous(the thickness of the adhesive material 3 can be ignored relative to its length and width).

In the electrochemical energy storage device according to the invention, the packing shell 2 can be selected from a flexible packing shell or a hard packing shell.

In the electrochemical energy storage device according to the present invention, the substance that can bear charges may contain a conjugated Π-bond, and thus has a high electrochemical activity, which can improve the electrochemical performance of the electrochemical energy storage device.

In the electrochemical energy storage device according to the present invention, the mass percentage of the charge-carriable substance contained in the protective layer 32 may not be less than 50%. After the protective layer 32 is partially or completely dissolved in the electrolyte, it is difficult to serve as a good charge carrier to improve the cycling performance and low-temperature performance of the electrochemical energy storage device when the content of the charge-carriable substance is very low.

In the electrochemical energy storage device according to the present invention, the protective layer 32 may further contain a substance that cannot bear charges. The non-charge-carriable substance must be non-adhesive before it is injected into the electrolyte at normal temperature and pressure, which ensuring that the protective layer 32 is non-adhesive under normal temperature and pressure, and so it will not cause any problem that it is difficult for the electrode assembly 1 to be placed into a shell. The non-charge-carriable material may be selected from polyvinylidene fluoride (PVDF), temperature-sensitive adhesive without any tackiness at normal temperature, pressure-sensitive adhesive without tackiness at normal temperature and reactive adhesive and any combinations and any combinations thereof. The temperature-sensitive adhesive is a type of adhesive sensitive to temperature, the temperature-sensitive adhesive without any tackiness at normal temperature refers that will not produce sticky Knot effect to object when the object contact the temperature-sensitive adhesive for a short-term under the action of acupressure. The pressure-sensitive adhesive without any tackiness at normal temperature refers that will not produce sticky Knot effect to object when the object contact the pressure-sensitive adhesive for a short-term under the action of acupressure. The reactive adhesive refers to the adhesive layer without any tackiness in the initial state, which will become adhesive when a chemical reaction occurred between the components of the adhesive layer or between the component of the adhesive layer and surround substances contacted in case of heat, organic solvents or acidic conditions.

In the electrochemical energy storage device according to the present invention, in particular, the temperature-sensitive adhesive with no tackiness at normal temperature may be selected from polyolefins, polyvinyl butyral, polyamides and polyesters and any combinations and any combinations thereof. The pressure-sensitive adhesive with no tackiness at normal temperature may be selected from ethylene-butylene-polystyrene linear triblock copolymer (SEBS), styrene-butadiene block copolymer (SEPS) and epoxidized benzene Ethylene-isoprene-styrene block copolymer (ESIS) and any combinations thereof. The reactive adhesive may be selected from epoxy resin, phenol resin and urea resin and any combinations thereof. PVDF can be dissolved or swelled partially or completely in the electrolyte to increase the adhesion between the pole piece and the pole piece, the pole piece and the separator film without worsening the performance of the electrochemical energy storage device. The temperature-sensitive adhesive without any tackiness at normal temperature, the pressure-sensitive adhesive without tackiness at normal temperature, and the reactive adhesive in the protective layer 32 is non-adhesive at normal temperature and pressure, which will not cause the problem of hard-wearing electrode assembly 1. And after the protective layer 32 is completely or partially dissolved in the electrolyte to expose the adhesive surface of the adhesive layer 31, the electrode assembly 1 and the package shell 2 may be bonded together with the protective layer 32 and the adhesive layer 31 (such as pressurizing and/or heating the package shell 2 from outside). Thus, the non-charge-carriable substance plays the role of enhancing the adhesion of the protective layer 32 on the adhesive layer 31 of the adhesive material 3 and adjusting the state of the protective layer 32 by adjusting the ratio of the charge-carriable substance to the non-charge-carriable substance so as to facilitate the subsequent assembly of the electrochemical energy storage device.

In the electrochemical energy storage device according to the present invention, the protective layer 32 is in a solid or viscous state at normal temperature and pressure. For example, the protective layer 32 can be adjusted to have a viscosity of more than 100,000 mp·s at normal temperature and normal pressure. In this case, the protective layer 32 is in a viscous and non-flowable state or the protective layer 32 is in a solid state or in a near solid state to facilitate subsequent assembly of the electrochemical energy storage device.

In the electrochemical energy storage device according to the present invention, the protective layer 32 has a solubility in the electrolyte at normal temperature of not less than 0.01 g. The solubility of the protective layer 32 in the electrolyte at normal temperature is less than 0.01 g, that is, the protective layer 32 cannot be dissolved in the electrolyte and the adhesive layer 31 cannot be exposed, so that the electrode assembly 1 and the packing shell 2 cannot be bonded together, and the charge-carriable substance are hard to be used as good charge carriers to improve the cycling performance and low temperature performance of electrochemical energy storage devices.

In the electrochemical energy storage device according to the present invention, the charge-carriable substance is selected from one or more of the group consisting of a charge-carriable small molecule compound that is solid at normal temperature, a charge-carriable macromolecular organics that is solid at normal temperature, a mixture of the charge-carriable small molecule that is solid at normal temperature and the charge-carriable small molecule compound that is liquid at normal temperature, a mixture of the charge-carriable macromolecular organics that is solid at normal temperature and the charge-carriable small molecule compound that is liquid at normal temperature. Wherein, the mass ratio of the mixture of the charge-carriable small molecule compound which is solid at normal temperature and the charge-carriable small molecule compound which is liquid at normal temperature may be greater than or equal to 1:1 so as to ensure that the mixture is solid state (near solid state) or viscous state at normal temperature and pressure, thereby ensuring that the protective layer 32 is in a solid state or a viscous state at normal temperature and pressure so as to facilitate the subsequent assembly of the electrochemical energy storage device. The mass ratio of the mixture of the charge-carriable macromolecular organics which is solid at normal temperature and the charge-carriable small molecule compound which is liquid at normal temperature is greater than or equal to 1:2 so as to ensure that the mixture is in a solid state (near solid state) or a viscous state at normal temperature and pressure, thereby ensuring that the protective layer 32 is solid or viscous at normal temperature and pressure to facilitate the subsequent assembly of the electrochemical energy storage device.

In the electrochemical energy storage device according to the present invention, the charge-carriable small-molecule compound which is in the solid state at normal temperature can be selected from one or more of the group consisting of propylene sulfate, vinylene sulfate, biphenyl, propane sultone, methylene methane disulfonate, metallocene compound, 2-t-butyl-4-hydroxyanisol and thianthrene and its derivatives.

In the electrochemical energy storage device according to the present invention, the charge-carriable small molecule compound that is liquid at normal temperature may be selected from one or more of vinylene carbonate, fluoroethylene carbonate and adiponitrile.

In the electrochemical energy storage device according to the present invention, the charge-carriable macromolecular organics may be selected from one or more of polyacetylene, bromine-doped polyacetylene, iodine-doped polyacetylene, polypyrrole, polyparaphenylene, polyphenylene sulfide ether, polyaniline and polypyridine In the electrochemical energy storage device according to the present invention, the adhesive layer 31 may be selected from one or more of a temperature-sensitive adhesive, a pressure-sensitive adhesive and a reactive adhesive. One can make the adhesivity of the temperature-sensitive adhesive increase by heating the packing shell 2 from the outside, so as to bond the electrode assembly 1 and the packing shell 2 tightly together, and the adhesivity of the temperature-sensitive adhesive will be further enhanced if the ambient temperature increases slightly. The pressure-sensitive adhesive on temperature and humidity requirements are low, the adhesivity of the pressure-sensitive adhesive will increase if the packing shell 2 is pressurized externally after entering the shell, so as to bond the electrode assembly 1 and the packing shell 2 together. The reactive adhesive on environment temperature/humidity and overall process requirements are low, which bond the electrode assembly 1 and the packing shell 2 together by chemical reaction.

In the electrochemical energy storage device according to the present invention, the temperature-sensitive adhesive of the adhesive layer 31 may be selected from one or more of terpene resins, petroleum resins, polyolefins, polyvinyl butyral, polyamides and polyesters. The temperature-sensitive adhesive can also be combined with naphthenic oil, naphthenic oil is in liquid at normal temperature and pressure, which cannot be shaped into film when used alone, and thus cannot be used alone, but the combination of naphthenic oil and other temperature-sensitive adhesive have a strong adhesivity.

In the electrochemical energy storage device according to the present invention, the pressure-sensitive adhesive of the adhesive layer 31 may be selected from one or more of ethylene-butylene-polystyrene linear triblock copolymer (SEBS), styrene-butadiene Block copolymer (SEPS), epoxidized styrene-isoprene-styrene block copolymer (ESIS), acrylic resin adhesive, thermosetting polyurethane adhesive, silicone resin adhesive, natural rubber and synthetic rubber.

In the electrochemical energy storage device according to the present invention, the reactive adhesive may be selected from one or more of epoxy resin, phenol resin and urea resin.

In the electrochemical energy storage device according to the present invention, the adhesive layer 31 may have fluidity. After the electrode assembly 1 is placed into the packing shell 2, the adhesive material of the adhesive layer 31 is partly extruded to the periphery of the original position of the adhesive layer 31 under pressure and/or heating due to the fluidity of the adhesive layer 31, thereby reduce the thickness of the adhesive material 3 and increase the bonding area, and make the electrode assembly 1 and the packing shell 2 tightly bonded together.

In the electrochemical energy storage device according to the present invention, the adhesive layer 31 may further include an inorganic additive. The use of the inorganic additive can effectively control the adhesivity of the adhesive layer 31 so that the adhesive material 3 does not flow to the encapsulation side of the electrode assembly 1 under the pressure and/or heating, which solves the problem of poor packaging caused by irregular flow of the adhesive material 3.

In the electrochemical energy storage device according to the present invention, the inorganic additive may be selected from one or both of $Al_2O_3$ and $SiO_2$.

In the electrochemical energy storage device according to the present invention, the thickness of the adhesive layer 31 may be from 3 μm to 40 μm.

In the electrochemical energy storage device according to the present invention, the protective layer 32 may have a thickness of 2 μm to 20 μm.

Figure 4:
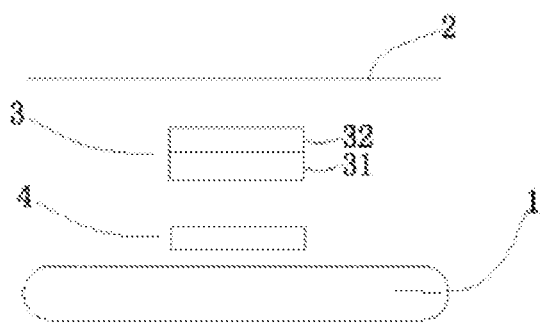
FIG. 4 is an exploded schematic view of another embodiment of an electrochemical energy storage device according to the present invention, schematically illustrated in cross-section, taken along line A-A of FIG. 1.
Figure 5:
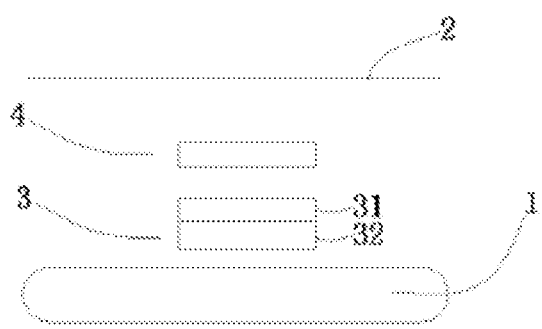
FIG. 5 is an exploded schematic view of another embodiment of the electrochemical energy storage device according to the present invention, which is illustrated by a cross-section and is made from the line A-A in FIG. 1.

Referring to FIG. 4 and FIG. 5, in the electrochemical energy storage device according to the present invention, the electrochemical energy storage device may further comprise a one-sided or two-sided adhesive tape 4. Referring to FIG. 4, the adhesive surface of the adhesive tape 4 is adhesively disposed on the outer surface of the electrode assembly 1 and the other surface of the adhesive tape 4 is bonded to the adhesive material 3 so that the adhesive material 3 is indirectly bonded to the outer surface of the electrode assembly 1. In this way, by the transfer and transmission of force, it is possible to prevent the surface of the electrode assembly 1 from being damaged (such as tearing aluminum foil) due to the strong adhesive force of the adhesive material 3 to the surface of the electrode assembly 1 (such as aluminum foil) during the drop test, which may cause chemical energy storage device failure. Referring to FIG. 5, the adhesive surface of the adhesive tape 4 may also be disposed on the inner surface of the packing shell 2 and the other surface of the adhesive tape 4 is adhered to the adhesive material 3 so that the adhesive material 3 is indirectly disposed on the inner surface of the packing shell 2. In this way, by the transfer and transmission of force, it is possible to prevent the surface of the packing shell 2 from being damaged (such as tearing the aluminum film) due to the strong adhesive force of the adhesive material 3 to the surface of the packing shell 2 (such as an aluminum-plastic film) during the drop test, which will result in failure of electrochemical energy storage device.

In the electrochemical energy storage device according to the invention, the substrate of the adhesive tape 4 may be selected from one or more of the group consisting of polyethylene terephthalate (PET), oriented polypropylene (PP) and polyimide (PI).

In the electrochemical energy storage device according to the present invention, the adhesive of the adhesive tape 4 may be selected from one or more of acrylic resin, thermosetting polyurethane adhesive, silicone adhesive, natural rubber and synthetic rubber.

In the electrochemical energy storage device according to the present invention, the adhesive tape 4 may have a thickness of 3 μm to 20 μm.

Next, examples and comparative examples of the electrochemical energy storage device according to the present invention will be described.

Example 1

1. Preparation of a Positive Plate $LiCoO_2$, conductive carbon, and polyvinylidene fluoride were dispersed in N-methylpyrrolidone at a weight ratio of 96.5:1:2.5 to prepare a positive electrode slurry, and then the positive electrode slurry was uniformly coated on a surface of a current collector aluminum foil, followed by heating and drying, welding of the tab, to produce a positive plate with the thickness of 98 μm.

2. Preparation of a Negative Plate

Graphite, conductive carbon, sodium carboxymethyl cellulose and styrene-butadiene rubber were dispersed in deionized water in a weight ratio of 96:1:2:1 to prepare a negative electrode slurry, and the negative electrode slurry was uniformly coated on a surface of a collector copper foil, Followed by heat and drying, and welding of the tab, to produce a negative plate with the thickness of 89 μm.

3. Preparation of the Electrolyte

EC, PC, DEC, and EMC by the weight ratio of 20:20:45:15 were prepared into a non-aqueous organic solvent, and 1 mol/L of $LiPF_6$ was added as a lithium salt to complete the preparation of the electrolyte.

4. Preparation of the Electrode Assembly

The prepared positive plate, PP separator, and negative plate were sequentially wound to prepare a wound type electrode assembly having a thickness of 3.0 mm, a width of 60 mm and a length of 80 mm.

5. Preparation of Adhesive Material (See FIG. 3)

The adhesive material comprises an adhesive layer and a protective layer, the length of the adhesive material is 75 mm, the width is 8 mm and the thickness is 23 μm; wherein, the adhesive layer is a mixture of polybutene (PB) and terpene resin (mass ratio is 3:1), the thickness of which is 20 μm;

the protective layer is propylene sulfate with a thickness of 3 μm, and the protective layer is in a solid state at normal temperature and normal pressure.

6. Preparation of Lithium Ion Secondary Battery

The adhesive layer of adhesive material is directly affixed to the end of the wound electrode assembly, and then mount the packing shell, the electrolyte was injected, and then at 60° C., a surface pressure of 1 MPa is applied at the outer surface of the packing shell corresponding to the position where the adhesive material is affixed to the electrode assembly, so that the outer surface of the electrode assembly and the inner surface of the packing shell are adhesively bonded by the adhesive material to complete the preparation of the lithium ion secondary battery.

Example 2

A lithium ion secondary battery was prepared according to the method of Example 1 except for the following:
5. Preparation of Adhesive Material
The length of the adhesive material is 75 mm, the width is 8 mm and the thickness is 40 μm;
Wherein, the adhesive layer is a mixture of polybutene (PB) and terpene resin with a thickness of 20 μm;
The protective layer is made of biphenyl with a thickness of 20 μm, and the protective layer is in a solid state at normal temperature and normal pressure.

Example 3

A lithium ion secondary battery was prepared according to the method of Example 1 except for the following:
5. Preparation of Adhesive Material
The length of the adhesive material is 75 mm, the width is 8 mm, and the thickness is 25 μm;
Wherein, the adhesive layer is a mixture of polybutene (PB) and terpene resin with a thickness of 20 μm;
The protective layer is propane sultone with a thickness of 5 μm, and the protective layer is in a solid state at normal temperature and normal pressure.
6. Preparation of Lithium Ion Secondary Battery
The adhesive layer of adhesive material is directly affixed to the end of the wound electrode assembly, and then mount the packing shell, the electrolyte is injected, and then at 45° C., a surface pressure of 0.5 MPa is applied at the outer surface of the packing shell corresponding to the position where the adhesive material is affixed to the electrode assembly, so that the outer surface of the electrode assembly and the inner surface of the packing shell are adhesively bonded by the adhesive material to complete the preparation of the lithium ion secondary battery.

Example 4

A lithium ion secondary battery was prepared according to the method of Example 1 except for the following:
5. Preparation of Adhesive Material (See FIG. 4)
1) Adhesive Material
The adhesive material comprises an adhesive layer and a protective layer, the length of the adhesive material is 75 mm, the width is 8 mm and the thickness is 23 μm;
The adhesive layer is a mixture of polybutene (PB) and terpene resin with a thickness of 20 μm;
The protective layer is vinylene sulfate, with a thickness of 3 μm, and the protective layer is in a solid state at normal temperature and pressure.
2) Adhesive Tape
The adhesive tape is a green adhesive having a length of 75 mm, a width of 8 mm and a thickness of 15 μm. The substrate of the green adhesive is polyethylene terephthalate (PET), and the adhesive of the green adhesive is an acrylic resin coated on one surface of the substrate, the adhesive was polyethylene terephthalate (PET) having a thickness of 7 μm and acrylic resin having a thickness of 8 μm.
6. Preparation of Lithium Ion Secondary Battery
At the end of the electrode assembly paste a adhesive tape. The adhesive layer of adhesive material is directly affixed to the adhesive tape, and then mount the packing shell, the electrolyte is injected, and then at 60° C., a surface pressure of 1 MPa is applied at the outer surface of the packing shell corresponding to the position where the adhesive material is affixed to the electrode assembly, and the outer surface of the electrode assembly and the inner surface of the packing shell are adhesively bonded via adhesive material and adhesive tape, to complete the preparation of the lithium ion secondary battery.

Example 5

A lithium ion secondary battery was prepared according to the method of Example 1 except for the following:
5. Preparation of Adhesive Materials
The length of the adhesive material is 75 mm, the width is 8 mm, and the thickness is 30 μm;
Wherein, the adhesive layer is a mixture of polybutene (PB) and terpene resin with a thickness of 20 μm;
The protective layer is a mixture of adiponitrile and polyphenylene sulfide (the mass ratio is 2:1), the thickness is 10 μm, and the protective layer is in a solid state at normal temperature and pressure.

Example 6

A lithium ion secondary battery was prepared according to the method of Example 1 except for the following:
5. Preparation of Adhesive Materials
The length of the adhesive material is 75 mm, the width is 8 mm, and the thickness is 22 μm;
Wherein, the adhesive layer is a mixture of polybutene (PB) and terpene resin with a thickness of 20 μm;
The protective layer is polyaniline, the thickness is 2 μm, and the protective layer is in a solid state under normal temperature and pressure.

Example 7

A lithium ion secondary battery was prepared according to the method of Example 1 except for the following:
1. Preparation of Positive Plate
Replace $LiCoO_2$ with lithium manganate.
5. Preparation of Adhesive Material
The length of the adhesive material is 75 mm, the width is 8 mm and the thickness is 40 μm;
Wherein, the adhesive layer is a mixture of polybutene (PB) and terpene resin with a thickness of 20 μm;
The protective layer is a mixture of methylene methane disulfonate and polyvinylidene fluoride (the mass ratio is 1:1), with a thickness of 20 μm, and the protective layer is in a solid state at normal temperature and pressure.

Example 8

A lithium ion secondary battery was prepared according to the method of Example 1 except for the following:
5. Preparation of Adhesive Materials
The length of the adhesive material is 75 mm, the width is 8 mm and the thickness is 40 μm;
Among them, the adhesive layer is polystyrene;
The protective layer is a mixture of propane sultone and adiponitrile (the mass ratio is 1:1), the thickness is 10 μm, and the protective layer is in a solid state at normal temperature and pressure.

Example 9

A lithium ion secondary battery was prepared according to the method of Example 1 except for the following:
6. Preparation of Lithium Ion Secondary Battery
The adhesive layer of adhesive material is directly affixed to the inner surface of the packing shell, right against the center of the electrode assembly, and then the electrode assembly is placed into the packing shell, the electrolyte is injected, and then at 60° C., a surface pressure of 1 MPa is applied at the outer surface of the packing shell affixed with the adhesive material, and the outer surface of the electrode assembly and the inner surface of the packing shell are adhesively bonded via adhesive material, to complete the preparation of the lithium ion secondary battery.

Comparative Example 1

A lithium ion secondary battery was prepared according to the method of Example 1, except for the following:
5. Preparation of Adhesive Material
The adhesive material is double-sided acrylic adhesive with a length of 75 mm, a width of 8 mm and a thickness of 20 μm. The double-sided acrylic resin adhesive uses polyethylene terephthalate (PET) as a substrate, and uses a acrylic resin coated on both sides of the substrate as an adhesive, the thickness of polyethylene terephthalate (PET) was 6 μm and the thickness of acrylic resin was 7 μm.
6. Preparation of Lithium Ion Secondary Battery
The double-sided adhesive is directly affixed to the winding end of the wound electrode assembly, the electrode assembly affixed with adhesive is placed into the packing shell, and then at 25° C., a surface pressure of 1 MPa is applied at the outer surface of the packing shell corresponding to the position where the adhesive material is affixed to the electrode assembly, and the adhesive surface of the adhesive material and the inner surface of the packing shell are adhesively bonded via adhesive material, to complete the preparation of the lithium ion secondary battery.

Comparative Example 2

A lithium ion secondary battery was prepared according to the method of Example 1, except for the following:
5. Preparation of Adhesive Material
The length of the adhesive material is 75 mm, the width is 8 mm, and the thickness is 23 μm;
Wherein, the adhesive layer is a mixture of polybutene (PB) and terpene resin with a thickness of 20 μm;
The protective layer is polypropylene, the thickness is 3 μm, and the protective layer is in a solid state at normal temperature and pressure.

Comparative Example 3

A lithium ion secondary battery was prepared according to the method of Example 1, except for the following:
5. Preparation of Adhesive Materials
The length of the adhesive material is 75 mm, the width is 8 mm, and the thickness is 23 μm;
Wherein, the adhesive layer is an ethylene-vinyl acetate copolymer and has a thickness of 20 μm;
The protective layer is oriented polystyrene (OPS) with a thickness of 3 μm and the protective layer is in a solid state at normal temperature and pressure.

Next, the test procedures and the test results of the lithium ion secondary battery according to the present invention will be described.
1. Drop Test of Lithium Ion Secondary Battery
The lithium ion secondary battery is fixed in the drop test fixture with double-sided adhesive, the 6 faces of the fixture are sequentially numbered 1, 2, 3, 4, 5, and 6, and the four corners of the fixture are numbered C1, C2, C3, and C4.
At 25° C., the fixture is placed on a 1.5 m-high test bench, in accordance with the order of 1-6 numbers drop lithium-ion secondary batteries, and then in accordance with the order of numbers C1-C4 sequentially drop lithium-ion secondary batteries, repeat 6 cycles to complete the drop test, stand 1 h,
(1) observe whether the packing shell of the lithium ion secondary battery breaks or top seal opens;
(2) disassemble the lithium ion secondary battery to observe whether there is a break in the tab of the electrode assembly;
(3) disassemble the lithium ion secondary battery to observe whether there is displacement or wrinkling on both sides of the separator in the width direction of the electrode assembly;
(4) disassemble the lithium ion secondary battery and observe whether there is a contact short circuit between the positive plate and the negative plate;
If none of the above conditions appears, the test is passed. Each group tests 10 lithium-ion secondary batteries, and record the pass rates of the drop tests of the lithium-ion secondary battery.
2. Cyclic Performance Test of Lithium Ion Secondary Battery
The lithium ion secondary battery was placed in a 25° C. incubator and charged at a constant current of 0.5 C with a cut-off voltage of 4.35 V and then charged with a constant voltage of 4.35 V, cut-off current 0.025 C. After standing for 3 minutes, 0.5 C constant current discharge, the cut-off voltage of 3.0V, the discharge capacity is recorded as $D_0$, this is a charge-discharge cycle, repeated 800 times of the above charge-discharge process, the 800th cycle discharge capacity recorded as $D_1$.

Capacity retention after 800 cycles=$D_1/D_0 \times 100\%$.

3. Low Temperature Performance Test of Lithium Ion Secondary Battery
The lithium ion secondary battery was placed in a 0° C. incubator, 0.7 C rate constant current charge, cut-off voltage of 4.35V, and then charged at 4.35V constant voltage, cut-off current 0.025 C, stand for 3 min to 1 C constant current discharge, cut-off voltage 3.0V, this is a charge-discharge cycle, repeat the above charge and discharge process 20 times, disassemble the lithium-ion secondary battery to see whether there is lithium precipitation phenomenon in the negative electrode interface.
Table 1 shows the results of performance tests of Examples 1-9 and Comparative Examples 1-3.

| Entry | Drop test pass rate | Capacity retention rate after 800 cycles | Lithium precipitation at the negative electrode at low temperature |
|---|---|---|---|
| Example 1 | 100% | 90% | None |
| Example 2 | 100% | 90% | None |
| Example 3 | 100% | 90% | None |
| Example 4 | 100% | 90% | None |
| Example 5 | 100% | 92% | None |
| Example 6 | 100% | 90% | None |
| Example 7 | 100% | 88% | None |
| Example 8 | 100% | 90% | None |
| Example 9 | 100% | 90% | None |
| Comparative Example 1 | 80% | 80% | lithium precipitation |
| Comparative Example 2 | 20% | 80% | lithium precipitation |
| Comparative Example 3 | 100% | 70% | lithium precipitation |

As can be seen from the comparison between Examples 1 to 9 and Comparative Examples 1 to 3, the lithium ion secondary battery of the present invention has a high drop test pass rate and a high capacity retention after cycling, and there is no lithium precipitation in the negative electrode at low temperature. This is because the adhesive material of the present invention has a strong adhesive effect, and the protective layer of the adhesive material can be completely or partially dissolved in the electrolyte to expose the adhesive surface of the adhesive layer, particularly when the protective layer is in sticky or solid state at normal temperature and pressure, not only entry into the shell easily and improve the pass rates of the drop tests of the lithium-ion secondary battery; at the same time as the protective layer contains a charge-carriable substance, the charge-carriable substance can be used as a good charge carrier after the protected layer fully or partially dissolved in the electrolyte, to improve the cycle performance and low temperature performance of the lithium ion secondary battery.

In addition, the charge-carriable substance propylene sulfate in Example 1 can also prevent molecules of non-aqueous organic solvent PC in the electrolyte from being embedded in the graphite electrode. Vinylidene sulfate in Example 4 can reduce the thickness expansion due to heat generation during use of the lithium ion secondary battery. The methylene methane disulfonate in Example 7 can prevent the transition metal ions from being eluted and adsorbed on the surface of the negative electrode, and the PVDF in the protective layer can be dissolved or swelled partially or entirely in the electrolyte to increase the adhesive force between the plates and between the plate and the separator, and would not deteriorate the cycle performance and the low temperature performance of the lithium ion secondary battery. In Example 8, the material of the protective layer is a mixture of propane sultone, which is in a solid state at normal temperature, and adiponitrile (mass ratio of 1:1), which is in a liquid state at normal temperature, and is in a solid state at normal temperature and pressure, can also solve the problem that it is difficult to be placed into a shell, and as the protective layer can be completely dissolved in the electrolyte, not only the entire adhesive layer can be exposed to achieve a good bonding, but also the cycle performance and the low-temperature performance of the lithium ion secondary battery can be improved. Example 9 By sticking the adhesive layer directly to the inner surface of the packing shell, the non-adhesive protective layer faces the electrode assembly and is also convenient to be placed into a shell. After the assembly, the protective layer is dissolved in the electrolyte to expose the adhesive layer, and to bond the electrode assembly and the shell, the drop test pass rate is thus 100%, and soluble in the electrolyte of propylene sulfate can also improve cycle performance and low temperature performance of the lithium-ion battery.

In Comparative Example 1, acrylic double-sided tape with no protective layer is adopted. It's not only difficult to enter the shell, and the bonding effect is not satisfactory, resulting in drop test pass rate of only 80%, capacity retention rate after long-term cycle of only 80%, and there is lithium precipitation at negative electrode at low temperature.

In Comparative Example 2, although the adhesive material has a protective layer, the polypropylene protective layer cannot be dissolved in the electrolyte and therefore cannot bond the electrode assembly to the packing shell, resulting in a very low drop test pass of only 20%.

In Comparative Example 3, the protective layer of the adhesive material can be dissolved in the electrolyte, and the adhesive material has a good bonding effect. Therefore, the drop test pass rate can reach 100%; however, the protective layer OPS of Comparative Example 3 is electrochemically inert in the electrolyte, and cannot bear charges, and dissolved in the electrolyte will increase the viscosity of the electrolyte, resulting in poor electrochemical performance of the lithium ion secondary battery, with a long cycle capacity retention rate of only 70%, and there being lithium precipitation at the negative electrode at low temperature.

The invention claimed is:

1. An electrochemical energy storage device, comprising a electrode assembly, comprising a positive plate, a negative plate, and an separator film between the positive plate and the negative plate;
an electrolyte, which impregnates the electrode assembly; and
a packing shell, which packages the electrode assembly, and contains the electrolyte;
wherein,
said electrochemical energy storage device further comprises
an adhesive material located between the electrode assembly and the packing shell, comprising
an adhesive layer, which is directly or indirectly arranged on an outer surface of the electrode assembly and a surface far away from the electrode assembly is an adhesive surface; or which is directly or indirectly arranged on an inner surface of the packing shell and a surface close to the electrode assembly is an adhesive surface; and
a protective layer, which is arranged on the adhesive surface of the adhesive layer, the protective layer is non-adhesive at a normal temperature and pressure, and after the protective layer is fully or partially dissolved in the electrolyte, the adhesive surface of the adhesive layer is exposed to bond the electrode assembly with the packing shell, and the protective layer contains a charge-carriable substance.

2. The electrochemical energy storage device according to claim 1, wherein the charge-carriable substance contains conjugated π bond.

3. The electrochemical energy storage device according to claim 1, wherein the protective layer further comprises a non-charge-carriable substance.

4. The electrochemical energy storage device according to claim 3, wherein the non-charge-carriable substance is selected from one or more of polyvinylidene fluoride, temperature-sensitive adhesive that have no initial adhesiveness at normal temperature, pressure-sensitive adhesive that have no initial adhesiveness at normal temperature, and reactive adhesive.

5. The electrochemical energy storage device according to claim 4, wherein said temperature-sensitive adhesive that have no initial adhesiveness at normal temperature is selected from one or more of polyolefin, polyvinyl butyral, polyamides, and polyester.

6. The electrochemical energy storage device according to claim 4, wherein said pressure-sensitive adhesive that have no initial adhesiveness at normal temperature is selected from one or more of ethylene-butene-polystyrene linear triblock copolymer, styrene-butadiene block copolymer, and epoxidized styrene-isoprene-styrene block copolymer.

7. The electrochemical energy storage device according to claim 4, wherein said reactive adhesive is selected from one or more of epoxy resin, phenolic resin, and urea resin.

8. The electrochemical energy storage device according to claim 1, wherein the mass percentage of the charge-carriable substance in the protective layer is no less than 50%.

9. The electrochemical energy storage device according to claim 1, wherein the protective layer is in a solid or viscous state at normal temperature and normal pressure.

10. The electrochemical energy storage device according to claim 1, wherein the charge-carriable substance is selected from one or more of a charge-carriable small molecule compound that is in a solid state at normal temperature, a charge-carriable macromolecular organics that is in a solid state at normal temperature, a mixture of the charge-carriable small molecule compound that is in a solid state at normal temperature and a charge-carriable small molecule compound that is in a liquid state at normal temperature, a mixture of the charge-carriable macromolecular organics that is in a solid state at normal temperature and the charge-carriable small molecule compound that is in a liquid state at normal temperature.

11. The electrochemical energy storage device according to claim 10, wherein the charge-carriable small molecule compound that is in a solid state at normal temperature is selected from one or more of propylene sulfate, vinylene sulfate, biphenyl, propane sultone, methylene methane disulfonate, metallocene compound, 2-t-butyl-4-hydroxyanisol and thianthrene and its derivatives.

12. The electrochemical energy storage device according to claim 10, wherein the charge-carriable small molecule compound that is in a liquid state at normal temperature is selected from one or more of vinylene carbonate, fluoroethylene carbonate, and adiponitrile.

13. The electrochemical energy storage device according to claim 10, wherein the charge-carriable macromolecular organics is selected from one or more of polyacetylene, bromine-doped polyacetylene, iodine-doped polyacetylene, polypyrrole, polyparaphenylene, polyphenylene sulfide ether, polyaniline and polypyridine.

14. The electrochemical energy storage device according to claim 10, wherein the mass ratio of the mixture of the charge-carriable small molecule compound that is in a solid state at normal temperature and the charge-carriable small molecule compound that is in a liquid state at normal temperature is greater than or equal to 1:1.

15. The electrochemical energy storage device according to claim 10, wherein the mass ratio of the mixture of the charge-carriable macromolecular organics that is in a solid state at normal temperature and the charge-carriable small molecule compound that is in a liquid state at normal temperature is greater than or equal to 1:2.

16. The electrochemical energy storage device according to claim 1, wherein the adhesive layer is selected from one or more of temperature-sensitive adhesive, pressure-sensitive adhesive, and reactive adhesive.

17. The electrochemical energy storage device according to claim 16, wherein the temperature-sensitive adhesive is selected from one or more of terpene resin, petroleum resin, polyolefin, polyvinyl butyral, polyamides, and polyester.

18. The electrochemical energy storage device according to claim 16, wherein the pressure-sensitive adhesive is selected from one or more of ethylene-butene-polystyrene linear triblock copolymer, styrene-butadiene block copolymer, and epoxidized styrene-isoprene-styrene block copolymer, acrylic resin adhesive, thermosetting polyurethane adhesive, silicone resin adhesive, natural rubber and synthetic rubber.

19. The electrochemical energy storage device according to claim 16, wherein the reactive adhesive is selected from one or more of epoxy resin, phenolic resin, and urea resin.

20. The electrochemical energy storage device according to claim 17, wherein the temperature-sensitive adhesive is combined with naphthenic oil.

21. The electrochemical energy storage device according to claim 1, wherein the adhesive layer further comprises an inorganic additive.

22. The electrochemical energy storage device according to claim 21, wherein the inorganic additive is selected from one or two of $Al_2O_3$ and $SiO_2$.

23. The electrochemical energy storage device according to claim 1, wherein the solubility of the protective layer at normal temperature in the electrolyte is no less than 0.01 g.

24. The electrochemical energy storage device according to claim 1, wherein the adhesive layer have fluidity.

25. The electrochemical energy storage device according to claim 1, wherein the thickness of the adhesive layer is 3 to 40 μm.

26. The electrochemical energy storage device according to claim 1, wherein the thickness of the protective layer is 2 to 20 μm.

27. The electrochemical energy storage device according to claim 1, wherein the electrochemical energy storage device further comprises a single-sided or double-sided adhesive tape that is adhesive.

28. The electrochemical energy storage device according to claim 27, wherein an adhesive surface of the adhesive tape is arranged on the outer surface of the electrode assembly, and the other surface is bonded to the adhesive material, so that the adhesive material is indirectly arranged on the outer surface of the electrode assembly.

29. The electrochemical energy storage device according to claim 27, wherein an adhesive surface of the adhesive tape is arranged on the inner surface of the packing shell, and the other surface is bonded to the adhesive material, so that the adhesive material is indirectly arranged on the inner surface of the packing shell.

30. The electrochemical energy storage device according to claim 27, wherein a substrate of the adhesive tape is selected from one or more of polyethylene glycol terephthalate, oriented polypropylene, and polyimide.

31. The electrochemical energy storage device according to claim 27, wherein an adhesive agent of the adhesive tape is selected from one or more of acrylic resin adhesive, thermosetting polyurethane adhesive, silicone adhesive, natural rubber, and synthetic rubber.

32. The electrochemical energy storage device according to claim 27, wherein the thickness of the adhesive tape is 3 to 20 μm.

33. The electrochemical energy storage device according to claim 1, wherein the electrochemical energy storage device is selected from one or more of lithium ion secondary battery, supercapacitor, fuel cell, and solar cell.

34. The electrochemical energy storage device according to claim 1, wherein the electrode assembly is coiled electrode assembly, folded electrode assembly, or stacking coiled electrode assembly.

35. The electrochemical energy storage device according to claim 1, wherein the electrolyte comprises lithium salt and non-aqueous organic solvent.

36. The electrochemical energy storage device according to claim 35, wherein the lithium salt is selected from at least one of $LiPF_6$, $LiBF_4$, LiBOB, $LiAsF_6$, $Li(CF_3SO_2)_2N$, $LiCF_3SO_3$ and $LiClO_4$.

37. The electrochemical energy storage device according to claim 35, wherein the non-aqueous organic solvent is selected from cyclic carbonate, or linear carbonate, or a mixture of both.

38. The electrochemical energy storage device according to claim 1, wherein the packing shell is selected from soft packing shell or hard packing shell.

\* \* \* \* \*